May 5, 1959
E. P. HARRIS ET AL
2,884,957
FLEXIBLE TUBING
Filed Feb. 13, 1956
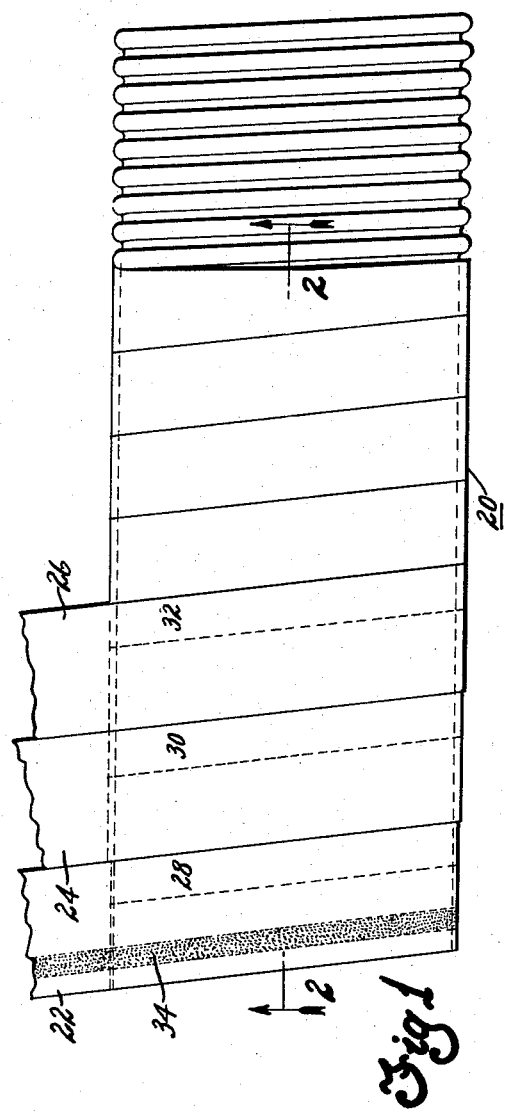
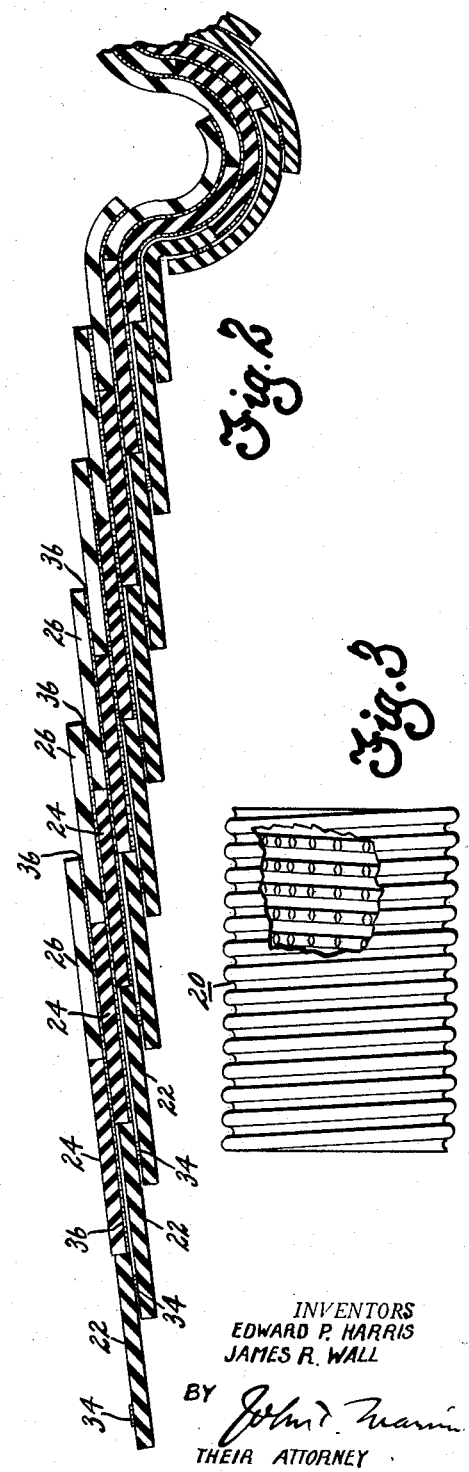
INVENTORS
EDWARD P. HARRIS
JAMES R. WALL
BY *John ?. _____*
THEIR ATTORNEY

United States Patent Office 2,884,957
Patented May 5, 1959

2,884,957
FLEXIBLE TUBING

Edward P. Harris and James R. Wall, Dayton, Ohio, assignors to General Motors Corporation, Detroit, Mich., a corporation of Delaware Application February 13, 1956, Serial No. 565,160

8 Claims. (Cl. 138—55)

This invention relates to tubing and is particularly concerned with flexible corrugated tubing.

It is the primary object of the invention to provide tubing that is flexible and strong and which is made up of layers of a plurality of tapes such as paper tapes.

In carrying out the above object, it is a further object to utilize a specific form of overlap whereby the several tapes which make up the tube provide a suitable wall thickness which may be corrugated without tearing and which supplies strength to the tube during use.

Another object of the invention is to provide a tube made up of $n$ number of tapes wherein each tape is overlapped upon itself a distance of $$\frac{1}{n}$$

and upon the next adjacent tape a distance of $$\frac{n-1}{n}$$

to produce a wall thickness of at least $n+1$, specifically the wall thickness of tubing of this character varies with alternating thicknesses of $n+1$ and $n+2$.

Another object of the invention is to provide tubing made from a plurality of strips of paper tape material wound in progressively overlapped relation wherein the first strip includes an adhesive stripe or layer on its top side and adjacent its trailing edge with respect to the direction of winding of the tubing whereby this edge is adhered to the next layer of the same tape and wherein subsequent tapes have adhesive at their bottom side and over their full extent.

Further objects and advantages of the present invention will be apparent from the following description, reference being had to the accompanying drawings wherein Figure 1 is a fragmentary view showing a tube being wound at the left hand side of the figure and showing the corrugated finished tubing at the right hand side of the figure.

Figure 2 is an enlarged section of one wall of the tube taken on line 2—2 of Figure 1 and Figure 3 is a view showing a finished piece of tubing with a portion thereof broken away to expose the inner surface of the tubing.

Flexible tubing made from paper tape material has been used to some extent and with varying degrees of success. This tubing for the most part has not been satisfactory for heavy duty applications due to the fact that it lacks strength and rigidity and is susceptible to moisture pick-up and unraveling. The present invention provides a paper tube that overcomes all of these past difficulties and provides a tube made from a paper which is impregnated with a water-proofing compound and which is adhered together in several layers thereof by means of a water insoluble adhesive to present a sturdy tube that is highly flexible and that can be used in most applications where rubber tubing has heretofore been necessary. The tube, as disclosed in this application, may be made by the method and on an apparatus as disclosed and claimed in copending application, S.N. 565,161, filed July 20, 1956, assigned to the assignee of the present invention.

The tube in the present instance is unique in the specific structure thereof wherein a plurality of tapes, preferably at least three, are wound spirally in overlapped relation to provide a heavy walled tube which has a wall thickness taken at any longitudinal section thereof equal to four and five times the thickness of one of the tapes wherein said thickness alternates in a spiral.

This is accomplished by utilizing an overlap which is mathematically worked out for a given number of tapes, for example, when using $n$ number of tapes, each tape is overlapped a distance of $$\frac{1}{n}$$

upon itself and $$\frac{n-1}{n}$$

on the next adjacent tape which will automatically produce a minimum wall thickness of $n+1$. Actually, this wall thickness will alternate on the longitudinal section of the tube from $n+1$ to $n+2$. Thus, if three tapes are provided in the manufacture of the tube, the overlap $$\frac{1}{n}$$

will be one-third and two-thirds, respectively, of the width of any one tape to provide a wall thickness of at least four times the thickness of one tape alternating with a thickness of five times the thickness of one tape, stated differently, there will be a spiral path running longitudinally of the tube of four thicknesses of tape adjacent a spiral path running longitudinally of the tube of five thicknesses of the tape.

Similarly, if four tapes are used, the overlap will be one-fourth and three-fourths, respectively, the width of each tape to provide a minimum wall thickness equal to the thickness of five tapes and a maximum wall thickness equal to the thickness of six tapes. This specific overlap is preferred and is of considerable importance in manufacturing the tube since it provides a tube that is sufficiently sturdy to be utilized in many applications where prior art tubing was not at all useful.

Referring to Figure 1, tubing 20 is shown which is made up of three tapes 22, 24 and 26. Each tape is preferably overlapped on the next adjacent tape one-third of its width as at 28, 30 and 32, respectively. After the tube has once been started, this overlapping arrangement of the tapes will provide, as previously noted, four and five thicknesses of tape as will be seen from the cross-sectional view of the tubing in Figure 2. The tubing is wrapped on a mandrel as disclosed in the aforementioned copending application and is subsequently corrugated through a die to provide flexibility and crush strength in the tube.

The first tape 22 has adhesive applied thereto only in a small stripe as noted at 34 on the top side thereof. This stripe is approximately one-sixth of the width of the tape and is spaced in from the edge one-sixth of the width of the tape. Every subsequent tape has a full adhesive layer at the back side thereof as shown at 36 in Figure 2. The reason for the narrow band of adhesive 34 on the first tape is apparent when viewing Figure 2 which is a cross-sectional view of the wall of the tubing. It will be noted that the small overlap of the tape 22 upon itself, namely, the one-third of the width of the tape is provided with no other means of adherence than the stripe of adhesive 34. On the other hand, if the entire tape were to be coated, it would provide a double layer of adhesive at portions where tape 22 overlaps at 28 which would be an excess of the adhesive that would ooze out of the adjoining sections. Similarly, if the stripe of adhesive 34 is placed too close to the edge of the tape 22, upon compression thereof it would ooze out on the inside of the tube which would contact the mandrel during preparation of the tube and cause difficulty in removing tube from the mandrel. Therefore, a single layer of adhesive on the first tape should be spaced in from the edge of the tape a distance of approximately $$\frac{1}{2n}$$

and the width of this stripe of adhesive should be about $$\frac{1}{2n}$$

The paper tape material used in the corrugated tubing disclosed herein is preferably kraft paper which may be a fifty to eighty pound asphalt saturated stock, sixty-five pound stock being preferred. In the tube illustrated, a tape three-fourths of an inch wide is used which is overlapped one-fourth of an inch in a three tape tube. The adhesive applied to the tape is preferably an air drying water dispersed cement also known as a latex adhesive, for example, a polyvinyl alcohol latex or a butadiene styrene copolymer latex containing a resorcinol formaldehyde amine resin. This obviously is not a limiting factor since adhesives such as phenol formaldehyde cements, standard types of air drying rubber cements of natural, butadiene styrene copolymers, butadiene acrylonitrile copolymers, combinations thereof, or any of the known cements, may be used. These cements may be suitably compounded for proper initial tack, drying qualities, viscosity, etc., and may include fillers, if desired. In all cases, the cement should be water insoluble to protect the tube and prevent unraveling. Also other adhesives, such as solvent type and hot milk type cements may be used.

The cement may be coated either on the paper during the winding operation by transfer rolls, it may be applied by spraying or dipping, or it may be coated on the tape during manufacture thereof in much the same manner as a Scotch tape is prepared wherein the adhesive is a curable compound so that the tube will become permanent after winding. Also, the adhesive may be supplied in strip form and superimposed with its respective tape and wound therewith. The adhesive may be of the reactivating type wherein the adhesive is supplied as a film or layer on the tape in a relatively non-adhesive condition wherein it is made active through heat, pressure or solvent or combinations thereof before, after or during the winding operation.

All of the materials disclosed herein are useful in the manufacture of tubing of this character as are metal foils, cloth tapes impregnated with suitable materials, etc. Any of the foregoing, alone or in combination, may be used to make specific tubings useful for specific purposes although our basic invention is directed to a paper type of tubing.

It is understood that where cements are used that are not fully air drying, it is preferable to hasten the drying and/or cure by the application of heat during or after manufacture of the tube.

One desirable tape material now available is polyethylene coated kraft paper. The coating may be on one or both sides of the paper although, if a single coated paper tape is used, it is possible, for example, in a three tape tube, to dispose the polyethylene coating on contact with the mandrel in connection with the first tape and reverse the other two tapes to expose the coating exteriorly or the middle tape may be devoid of coating on either side. In this embodiment, any of the aforementioned adhesives may be used. The polyethylene is waterproof and water-resistant and produces a very desirable tube. In place of the polyethylene, other coatings may be used on the paper, for example, polyvinyl alcohol films, linear polyester material such as Du Pont "Mylar" films, etc.

Metal foils produce mechanical bonds and do not require an adhesive in most cases. For example, in a three tape tube, if the first and third tapes are metal and the middle or second tape is paper, no adhesive is necessary.

While the embodiments of the present invention as herein disclosed constitute preferred forms, it is to be understood that other forms might be adopted.

What is claimed is as follows:

1. A corrugated tube comprising $n$ number of tapes of substantially the same thickness in spirally wrapped overlapping relation wherein $n$ is equal to at least three, the overlap of each tape upon itself being $$\frac{1}{n}$$

and on the next adjacent tape being equal to $$\frac{n-1}{n}$$

to provide a minimum wall thickness equal to $n+1$, said tapes being adhered together at their overlapping portions by an adhesive in coextensive relation with one another throughout their full extent, said tube being spirally corrugated to provide flexibility therein.

2. A corrugated tube comprising $n$ number of tapes of substantially the same thickness in spirally wrapped overlapping relation wherein $n$ is equal to at least three, the overlap of each tape upon itself being $$\frac{1}{n}$$

and on the next adjacent tape being equal to $$\frac{n-1}{n}$$

to provide a minimum wall thickness equal to $n+1$, said tapes being adhered together at their overlapping portions and throughout their full extent by an adhesive applied in coextensive relation to the underside of all but the first tape wherein the adhesive is applied at the upper side of said tape in a stripe running parallel to the trailing edge thereof and spaced a distance of about $$\frac{1}{2n}$$

from the edge thereof, said stripe of adhesive being about $$\frac{1}{2n}$$

wide, said tube being spirally corrugated to provide flexibility therein.

3. The tubing as claimed in claim 1 wherein the tape material is kraft paper impregnated with phenol formaldehyde resin and wherein the adhesive is an air drying cement.

4. The tubing as claimed in claim 1 wherein the tape material is kraft paper coated with polyethylene.

5. A corrugated paper tube comprising three tapes spirally wrapped in overlapping relation wherein the overlap of each tape upon itself is one-third the width of the tape and on the next adjacent tape is two-thirds the width of the tape to provide a minimum wall thickness at least equal to four thicknesses of the tape material, said tapes being adhered together with an adhesive for coextensively bonding the tapes one to another, said tube being spirally corrugated to provide flexibility therein.

6. A corrugated tube comprising $n$ number of tapes of substantially the same thickness in spirally wrapped overlapping relation wherein $n$ is equal to at least three, the overlap of each tape on the next adjacent tape being equal to $$\frac{n-1}{n}$$

to provide a minimum wall thickness equal to $n+1$ and a maximum wall thickness equal to $n+2$ wherein said minimum and maximum wall thicknesses comprise contiguous spiral paths extending along the tube, said tapes being adhered together at their overlapping portions with a suitable adhesive throughout their full extent and said tube being spirally corrugated to provide flexibility therein.

7. A paper defroster hose made from three tapes of asphalt saturated kraft paper spirally wrapped in overlapped relation wherein the overlap of each tape on the next adjacent tape is equal to two-thirds the width of the tape whereby a minimum wall thickness is provided equal to four times the thickness of the tape, said tapes being adhered together with a suitable adhesive applied to the underside of the second and third tapes and applied in a narrow stripe running parallel to the trailing edge of the first tape, said stripe of adhesive on the first tape being spaced about one-sixth of the width of the tape from the edge thereof and being about one-sixth of the width of the tape wide, said tube being spirally corrugated to provide flexibility therein.

8. The tube claimed in claim 5 wherein the innermost tape includes a coextensive film of polyethylene at the inner surface thereof and the outermost tape includes a coextensive film of polyethylene at its outer side whereby the tube is rendered water-resistant both inside and out.

References Cited in the file of this patent
UNITED STATES PATENTS

| 1,388,467 | Keller | Aug. 23, 1921 |
| 1,854,297 | Garling | Apr. 19, 1932 |
| 1,996,066 | Garling | Apr. 2, 1935 |
| 2,033,717 | Kopetz | Mar. 10, 1936 |
| 2,355,584 | Douglas | Aug. 8, 1944 |
| 2,637,674 | Stahl | May 5, 1953 |
| 2,677,165 | Copenhaver et al. | May 4, 1954 |